United States Patent
Ueda et al.

(10) Patent No.: US 9,174,646 B2
(45) Date of Patent: Nov. 3, 2015

(54) MOTOR CONTROL DEVICE FOR ELECTRIC VEHICLE

(71) Applicants: Nissan Motor Co., Ltd., Yokohama, Kanagawa (JP); JATCO LTD, Fuji-shi, Shizuoka (JP)

(72) Inventors: Naoharu Ueda, Yokohama (JP); Kenji Yoneda, Sagamihara (JP)

(73) Assignees: Nissan Motor Co., Ltd., Yokohama (JP); JATCO LTD., Fuji (JP)

(*) Notice: Subject to any disclaimer, the term of this patent is extended or adjusted under 35 U.S.C. 154(b) by 79 days.

(21) Appl. No.: 14/353,691

(22) PCT Filed: Oct. 23, 2012

(86) PCT No.: PCT/JP2012/077335
§ 371 (c)(1),
(2) Date: Apr. 23, 2014

(87) PCT Pub. No.: WO2013/065525
PCT Pub. Date: May 10, 2013

(65) Prior Publication Data
US 2015/0057856 A1 Feb. 26, 2015

(30) Foreign Application Priority Data

Nov. 1, 2011 (JP) ................................. 2011-239922

(51) Int. Cl.
*B60L 9/00* (2006.01)
*B60W 30/188* (2012.01)
(Continued)

(52) U.S. Cl.
CPC ............... *B60W 30/188* (2013.01); *B60L 7/14* (2013.01); *B60L 11/14* (2013.01); *B60L 11/1803* (2013.01);
(Continued)

(58) Field of Classification Search
CPC ............... B60W 10/08; B60W 10/10; B60W 2710/083; B60W 30/1882; B60W 10/06; B60W 10/107

USPC ............................................................ 701/22
See application file for complete search history.

(56) References Cited

U.S. PATENT DOCUMENTS 5,222,572 A * 6/1993 Yamagiwa ............... B62M 9/08
180/220
5,355,749 A * 10/1994 Obara ..................... B60K 6/543
477/15

(Continued)

FOREIGN PATENT DOCUMENTS

JP 5-168109 A 7/1993
JP 5-176419 A 7/1993
(Continued)

OTHER PUBLICATIONS

An Engliah Translation of Japanese Office Action for the corresponding Japanese patent application No. 2013-541711 issued on Oct. 21, 2014.

*Primary Examiner* — Redhwan K Mawari
(74) *Attorney, Agent, or Firm* — Global IP Counselors, LLP (57) ABSTRACT

An electric vehicle motor control device controls the transmission of power from an electric motor to driving wheels via an automatic transmission. The electric vehicle motor control device includes a vehicle speed detecting device that detects a vehicle speed of the electric vehicle and a controller. The controller includes a required driving power calculating section that calculates a required driving power of the electric vehicle, and a target motor rotational speed calculating section that calculates a target motor rotational speed. The target motor rotational speed is calculated so that an efficiency of a product of a power consumption rate of the electric motor and a transmission efficiency of the automatic transmission will become a prescribed target efficiency, based on the vehicle speed and the required driving power. The controller controls the electric motor based on the target motor rotational speed.

7 Claims, 5 Drawing Sheets

(51) Int. Cl.
   *B60L 11/14* (2006.01)
   *B60L 11/18* (2006.01)
   *B60L 7/14* (2006.01)
   *B60L 15/20* (2006.01)
   *B60W 10/08* (2006.01)
   *B60W 10/10* (2012.01)
   *B60W 30/18* (2012.01)

(52) U.S. Cl.
   CPC ......... *B60L 15/2009* (2013.01); *B60L 15/2045* (2013.01); *B60W 10/08* (2013.01); *B60W 10/10* (2013.01); *B60W 30/18009* (2013.01); *B60L 2210/40* (2013.01); *B60L 2240/12* (2013.01); *B60L 2240/421* (2013.01); *B60L 2240/423* (2013.01); *Y02T 10/642* (2013.01); *Y02T 10/70* (2013.01); *Y02T 10/7005* (2013.01); *Y02T 10/7077* (2013.01); *Y02T 10/7241* (2013.01); *Y02T 10/7283* (2013.01); *Y10S 903/93* (2013.01)

(56) References Cited

U.S. PATENT DOCUMENTS

| | | | | |
|---|---|---|---|---|
| 6,090,007 | A * | 7/2000 | Nakajima | B60K 6/485 477/15 |
| 2011/0077810 | A1* | 3/2011 | Katou | B60W 10/108 701/22 |
| 2015/0057856 | A1* | 2/2015 | Ueda | B60L 11/14 701/22 |

FOREIGN PATENT DOCUMENTS

| | | |
|---|---|---|
| JP | 5-336618 A | 12/1993 |
| JP | 10-244858 A | 9/1998 |
| JP | 10-248113 A | 9/1998 |
| JP | 2004-175320 A | 6/2004 |
| JP | 2009-133426 A | 6/2009 |
| JP | 2010-36741 A | 2/2010 |
| JP | 2011-73573 A | 4/2011 |

* cited by examiner

MOTOR CONTROL DEVICE FOR ELECTRIC VEHICLE

CROSS-REFERENCE TO RELATED APPLICATIONS

This application is a U.S. National stage application of International Application No. PCT/JP2012/077335, filed Oct. 23, 2012, which claims priority to Japanese Patent Application No. 2011-239922 filed in Japan on Nov. 1, 2011, the contents of which are hereby incorporated herein by reference.

BACKGROUND

1. Field of the Invention

The present invention relates to a motor control device for electric vehicles comprising a motor transmission system that transmits power from an electric motor to the drive wheels, such as electric cars equipped with only an electric motor as the motor or a hybrid vehicle equipped with an electric motor and an engine as the motor.

2. Background Information

Conventionally, as an electric vehicle, such as that disclosed in Japanese Laid-Open Patent Publication No. 1993-176419, which interposes an automatic transmission (a continuously variable transmission) in the above-described motor transmission system and transmits power from an electric motor to the drive wheels via this automatic transmission (a continuously variable transmission) is known.

Additionally, Japanese Laid-Open Patent Publication No. 1993-176419 further discloses a motor control technology in which, upon controlling the rotational speed of an electric motor via a shift control of the automatic transmission (a continuously variable transmission) in a manner in which the efficiency of the motor and the inverter that is in charge of the motor is maximized, that is, in a manner so that the power consumption rate (the power cost) is optimal, a target motor rotational speed that can achieve the required driving power is calculated, and the automatic transmission (a continuously variable transmission) is shifted to a target gear ratio that matches the actual rotational speed of the electric motor to this target motor rotational speed.

SUMMARY

However, the power loss while driving an electric vehicle is incurred not only from a loss in the electric motor and the inverter but also from a loss in the automatic transmission (a continuously variable transmission). Therefore, as with conventional technology that is represented by the motor controlling technology disclosed in Japanese Laid-Open Patent Publication No. 1993-176419, if only the efficiency of the electric motor and the inverter is taken into account, and a target motor rotational speed that can achieve the required driving power with the optimal power consumption rate is calculated, problems that will be explained below will be generated.

In other words, the conventional technology does not consider a loss in the automatic transmission (a continuously variable transmission), which is a loss other than a loss in the electric motor and the inverter, and calculates a target motor rotational speed that can achieve the required driving power with the optimal power consumption rate, so that this target motor rotational speed could be a motor rotational speed that is low in efficiency for the automatic transmission (a continuously variable transmission); thus, there is no guarantee that, as the power train as a whole including the automatic transmission (a continuously variable transmission), there is a target motor rotational speed that can achieve the required driving power with the optimal power consumption rate.

Thus, in a conventional motor control device, the motor could not be controlled so as to reliably achieve the required driving power with the optimal power consumption rate as the power train as a whole including the automatic transmission (a continuously variable transmission) (in an actual vehicle), so there was room for improvement in this regard.

The object of the present invention is to enable the calculation of target motor rotational speed information that can achieve the required driving power with the optimal power consumption rate, taking into consideration not only the loss in the electric motor and the inverter, as in the conventional cases, but also the loss in the automatic transmission (a continuously variable transmission) upon calculating the target motor rotational speed information that contributes to motor control by adding the vehicle speed to the determinants and thereby providing a motor control device for electric vehicles that can solve the above-described problem.

For this purpose, the motor control device for electric vehicles according to the present invention is configured in the following way. First, a motor control device, which is the premise of the present invention, is used in electric vehicles for transmitting the power from an electric motor to the driving wheels via an automatic transmission.

The present invention relates the following: a vehicle speed detecting device, a required driving power calculating section, and a target motor rotational speed information calculating section with respect to such a motor control device for electric vehicles. The vehicle speed detecting device detects the vehicle speed; the required driving power calculating section calculates the required driving power of the vehicle; and the target motor rotational speed information calculating section calculates the target motor rotational speed information of the electric motor, based on the vehicle speed and the required driving power, so that the combination of the power consumption efficiency of the electric motor and the transmission efficiency of the automatic transmission becomes a prescribed target efficiency; the motor control device of the present invention is characterized in that the configuration allows for control of the electric motor based on the target motor rotational speed information that is calculated by the target motor rotational speed information calculating section.

According to the motor control device for electric vehicles according to the present invention described above, since, upon calculating the target motor rotational speed information that contributes to the control of the electric motor, the motor rotational speed information of the electric motor, with which the combination of the power consumption efficiency of the electric motor and the transmission efficiency of the automatic transmission becomes a prescribed target efficiency, is set as the target motor rotational speed information, based on the vehicle speed and the required driving power, this target motor rotational speed information can become the motor rotational speed information that is considered, including both the loss related to the electric motor and the loss in the automatic transmission, and that can achieve the required driving power with the optimal power consumption rate.

Therefore, a guarantee can be made that the above-described target motor rotational speed information is the motor rotational speed information that can achieve the required driving power with the optimal power consumption rate as the power train as a whole including the automatic transmission (a continuously variable transmission) (in an actual vehicle). For this reason, as the power train as a whole (in an actual vehicle), the electric motor can be controlled so as to reliably achieve the required driving power with the optimal power consumption rate, and improvement of the power consumption rate can be reliably achieved.

BRIEF DESCRIPTION OF THE DRAWINGS

Referring now to the attached drawings which form a part of this original disclosure.

DETAILED DESCRIPTION OF THE EMBODIMENTS

Embodiments of the present invention will be described below based on the attached drawings.

EXAMPLE 1

Figure 1:
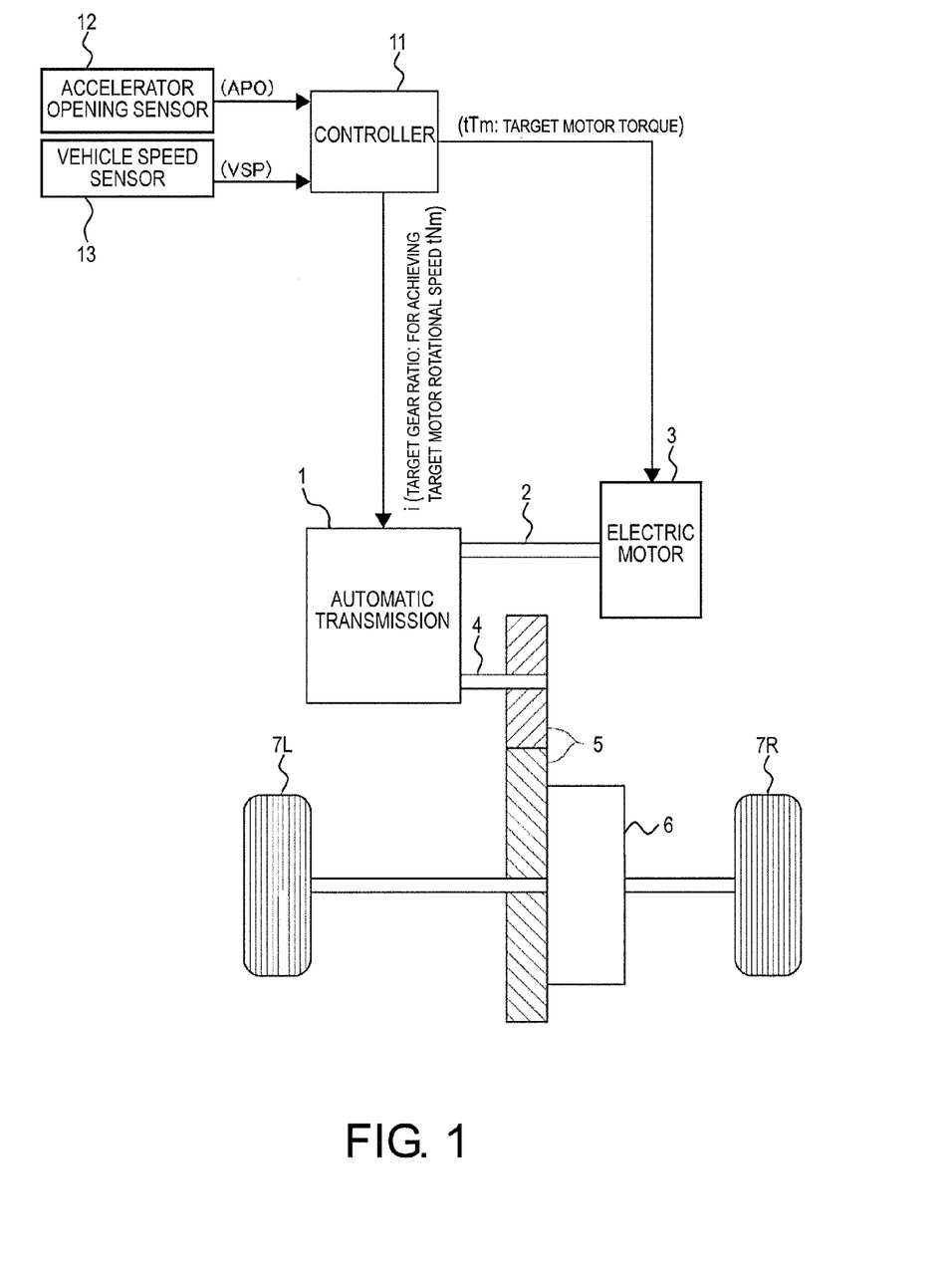
FIG. 1 is a system diagram schematically showing a power train of an electric vehicle equipped with a motor control device, along with the control system, that is one example of the present invention.

FIG. 1 schematically shows a power train of an electric vehicle equipped with a motor control device, along with the control system, which is one example of the present invention, and 1 represents an automatic transmission. In the present example, this automatic transmission 1 is a continuously variable transmission, such as a V-belt-type continuously variable transmission or a toroidal-type continuously variable transmission; however, this can also be a stepped automatic transmission.

In all cases, an electric motor 3 is attached to the input shaft 2 of the automatic transmission 1, and the left and right driving wheels 7L and 7R are sequentially attached to the output shaft 4 via a final speed reduction gear set 5 and a differential gear device 6.

Thus, the rotational force from the electric motor 3 to the input shaft 2 is shifted according to the gear ratio of the automatic transmission 1, after which the force reaches the left and right driving wheels 7L and 7R sequentially via the final speed reduction gear set 5 and the differential gear device 6, and is used for driving the vehicle.

Control System

The automatic transmission 1 and the electric motor 3 are each controlled by a common controller 11. In the automatic transmission 1, the actual gear ratio (the input rotational speed/output rotational speed) is shift controlled so as to follow a target gear ratio i (mentioned below) from the controller 11; in the electric motor 3, the actual motor torque is controlled by the drive force so as to match a target motor torque tTm (mentioned below) from the controller 11.

The controller 11, upon calculating the target gear ratio i mentioned above, calculates the target motor rotational speed (the target motor rotational speed information) tNm, as mentioned below, and sets the gear ratio necessary to match the actual motor rotational speed to this target motor rotational speed tNm as the above-described target gear ratio i. Therefore, the rotational speed control of the electric motor 3 that achieves the target motor rotational speed tNm is executed by the shift control of the automatic transmission 1 (achieving control of the target gear ratio i).

A signal from an accelerator opening sensor 12, which detects an accelerator opening APO that is the required load to the electric motor 3, and a signal from a vehicle speed sensor 13, which detects the vehicle speed VSP, for calculating the target motor torque tNm, the target motor rotational speed tNm and the target gear ratio I are input into the controller 11.

Motor Control

The controller 11, if shown by a functional block diagram, can be represented as in FIG. 2 and specifically executes the control program of FIG. 3 and executes the drive force control and the rotational speed control of the electric motor 3 in the following way.

Figure 2:
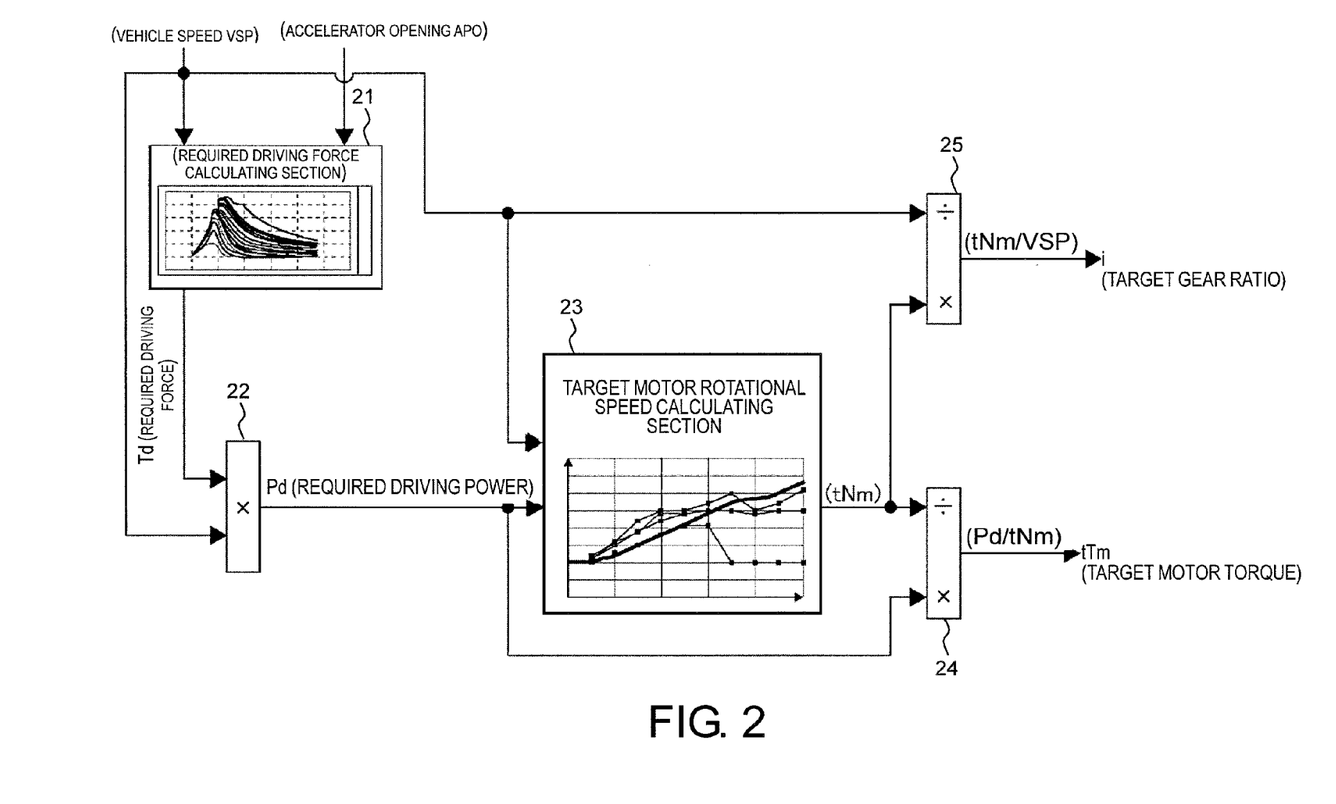
FIG. 2 is a block diagram by function of the motor control executed by the controller in FIG. 1.

First, to explain the outline with the block diagram of FIG. 2, in the required driving force calculating section 21, the required driving force (the torque value) Td desired by the driver is calculated from the accelerator opening APO and the vehicle speed VSP, i.e., from the current driving state, by searching a map that has been obtained by an experiment in advance.

A multiplier 22 calculates the required driving power Pd corresponding to the vehicle driving state by multiplying the vehicle speed VSP with the required driving force (the torque value) Td calculated in this way. Therefore, the required driving force calculating section 21 and the multiplier 22 correspond to the required driving power calculating section of the present invention.

Figure 4:
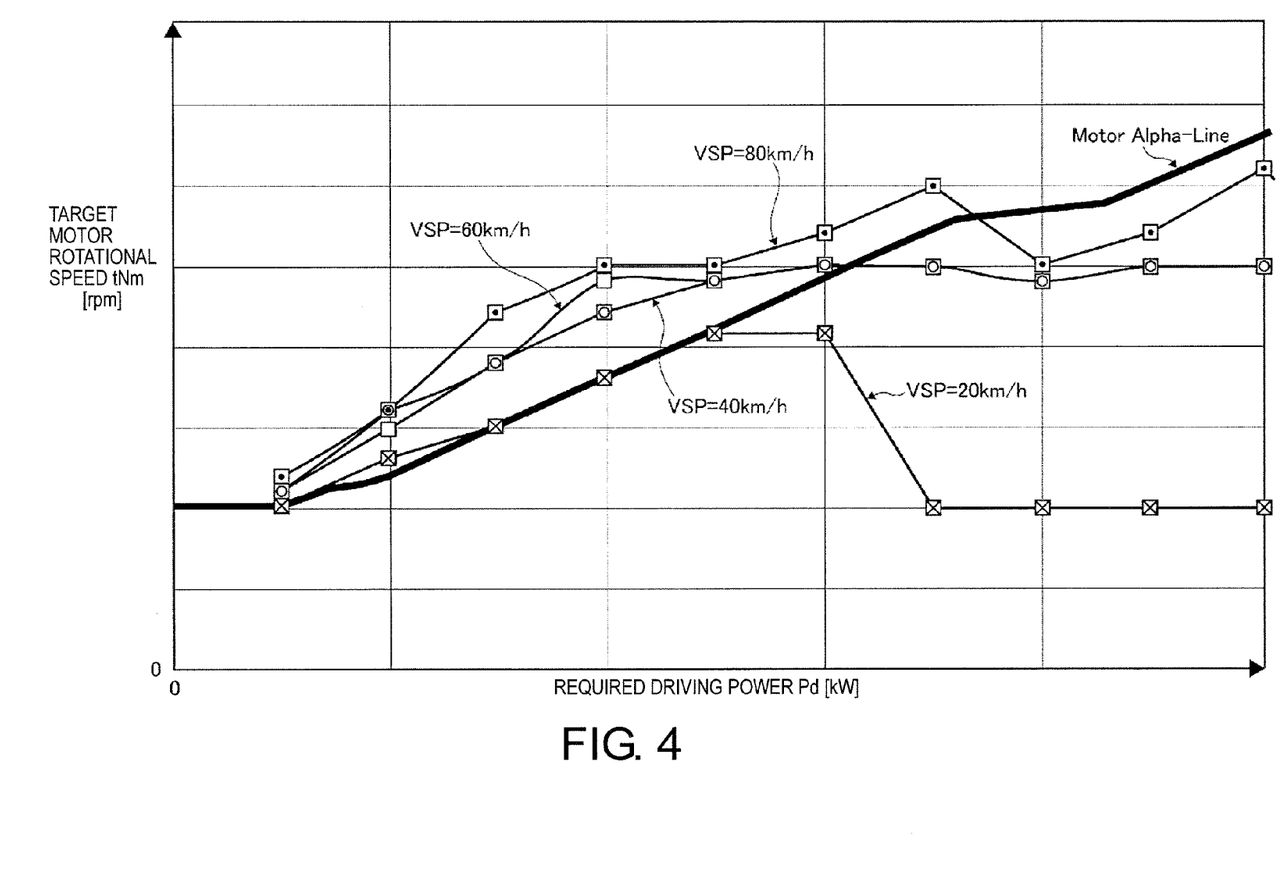
FIG. 4 is a variation characteristic diagram of the target motor rotational speed that should be calculated during motor control according to FIG. 2 and FIG. 3.

As illustrated in FIG. 4, the target motor rotational speed calculating means 23, based on a map related to the relationship between a combination of the required driving power Pd and the vehicle speed VSP, and the target motor rotational speed tNm that can achieve this combination with the optimal power consumption rate, which was obtained by experiment in advance, calculates the target motor rotational speed tNm that can achieve the combination of the required driving power Pd and the vehicle speed VSP with the optimal power consumption rate by searching from the required driving power Pd and the vehicle speed VSP. Therefore, the target motor rotational speed calculating section 23 corresponds to the target motor rotational speed information calculating means of the present invention.

Meanwhile, in FIG. 4, for reference, the vehicle speed VSP was not made a parameter (without considering the loss in the automatic transmission 1), and only losses in the electric motor 3 and the inverter (not diagrammed) in charge of the control were considered; a motor alpha-line (Motor Alpha-Line), which is also shown, represents the relationship between the target motor rotational speed tNm that can achieve the required driving power Pd with the best power consumption rate and the required driving power Pd. Conventionally, the target motor rotational speed tNm that can achieve this required driving power Pd with the best power consumption rate was calculated from the required driving power Pd based on this motor alpha-line (Motor Alpha-Line).

The divider 24 calculates the target motor torque tTm by the required driving power Pd by dividing the target motor rotational speed tNm, and the divider 25 calculates the target gear ratio i that is necessary to realize the target motor rotational speed tNm under the current vehicle speed VSP by dividing the target motor rotational speed tNm by the vehicle speed VSP. Therefore, the divider 24 corresponds to the target motor torque calculating means of the present invention, and the divider 25 corresponds to the target gear ratio calculating means of the present invention.

Figure 3:
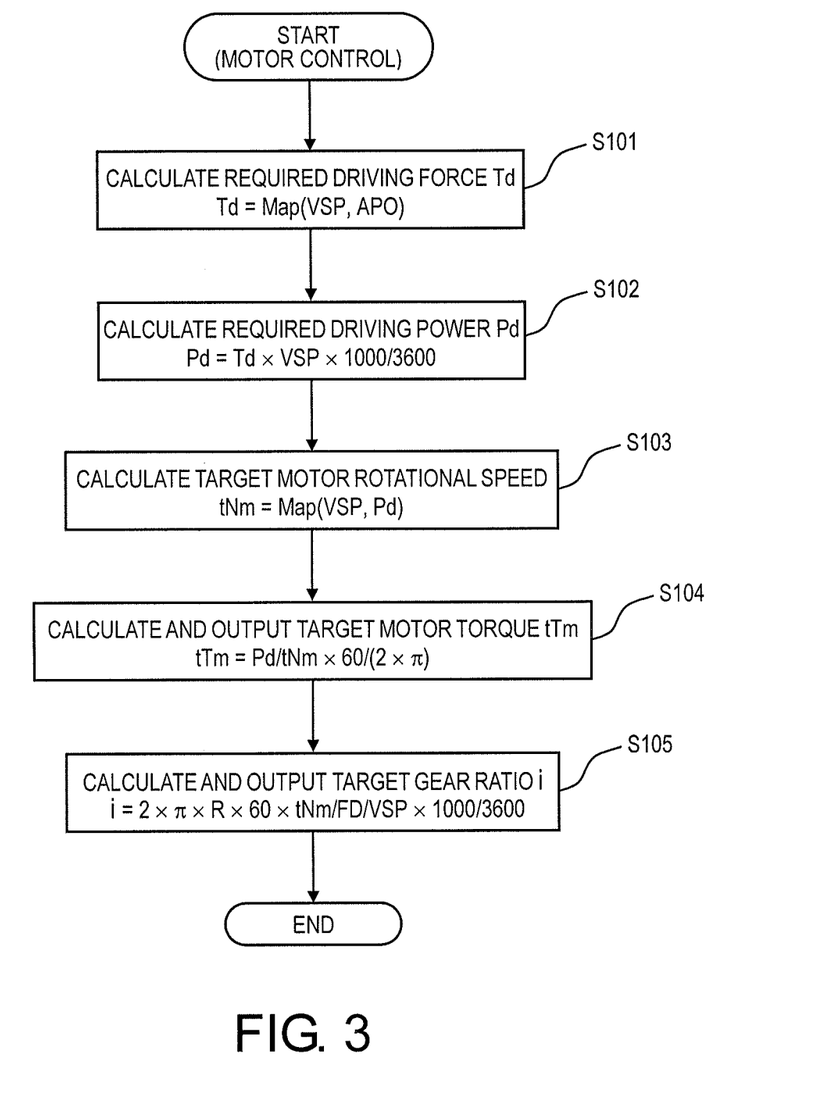
FIG. 3 is a flowchart showing the motor control program that is executed by the controller in FIG. 1.

The processing contents of FIG. 2 that are executed by the controller 11 are described in further detail with the flowchart of FIG. 3. In step S101, as described above for the required driving force calculating means 21, the required driving force (the torque value) Td desired by the driver is calculated from the accelerator opening APO and the vehicle speed VSP by searching a Map that is obtained by experiment, etc. in advance.

In the next step S102, as described above for the multiplier 22, the required driving power Pd corresponding to the vehicle driving state is calculated by using the following formula, in which the vehicle speed VSP is multiplied by the required driving force (the torque value) Td.

$$Pd = Td \times VSP \times 1000/3600 \quad (1)$$

Therefore, step S102 corresponds to the required driving power calculating means of the present invention.

In the next step S103, as described above for the target motor rotational speed calculating means 23, based on a Map related to the relationship between a combination of the required driving power Pd and the vehicle speed VSP, as well as the target motor rotational speed tNm that can achieve this combination with the best power consumption rate, as illustrated in FIG. 4, the target motor rotational speed tNm is detected from the required driving power Pd and the vehicle speed VSP. Therefore, step S103 corresponds to the target motor rotational speed information calculating means of the present invention.

In step S104, as described above for the divider 24, the target motor torque tTm is calculated by using the following formula, in which the required driving power Pd is divided by the target motor rotational speed tNm.

$$tTm = Pd/tNm/Pd \times 60/(2 \times \pi) \quad (2)$$

Therefore, step S104 corresponds to the target motor torque calculating means of the present invention.

In step S104, the controller 11 further outputs the target motor torque tTm obtained in the manner described above for the drive force control of the electric motor 3, as shown in FIG. 1, and the drive force controls the electric motor 3 so that the output torque matches the target motor torque tTm. Therefore, the controller 11 comprises the motor drive force calculating means of the present invention.

In step S105, as described above for the divider 25, the target gear ratio i is necessary to realize the target motor rotational speed tNm under the current vehicle speed VSP by using the following formula, in which the target motor rotational speed tNm is divided by the vehicle speed VSP (R is the movement radius of the driving wheels 7L and 7R; FD is the reduction gear ratio of the final speed reduction gear set 5).

$$i = 2 \times \pi \times R \times 60 \times tNm/FD/VSP \times 1000/3600 \quad (3)$$

Therefore, step S105 corresponds to the target gear ratio calculating means of the present invention.

In step S105, the controller 11 further outputs the target gear ratio i obtained in the way described above, as shown in FIG. 1, and shift controls the automatic transmission 1 so that the actual gear ratio (the input rotational speed/the output rotational speed) matches the target gear ratio i. Therefore, the controller 11 comprises the shift control means of the present invention.

Meanwhile, since the shift control of the automatic transmission 1 is what is necessary for the target gear ratio i to realize the target motor rotational speed tNm under the current vehicle speed VSP, this is related to controlling the rotational speed of the electric motor 3 so that the rotational speed matches the target motor rotational speed tNm and so that the rotational speed control of the electric motor 3 to realize the target motor rotational speed tNm is executed by the above-described shift control of the automatic transmission 1 (the achieving control of the target gear ratio i).

Figure 5:
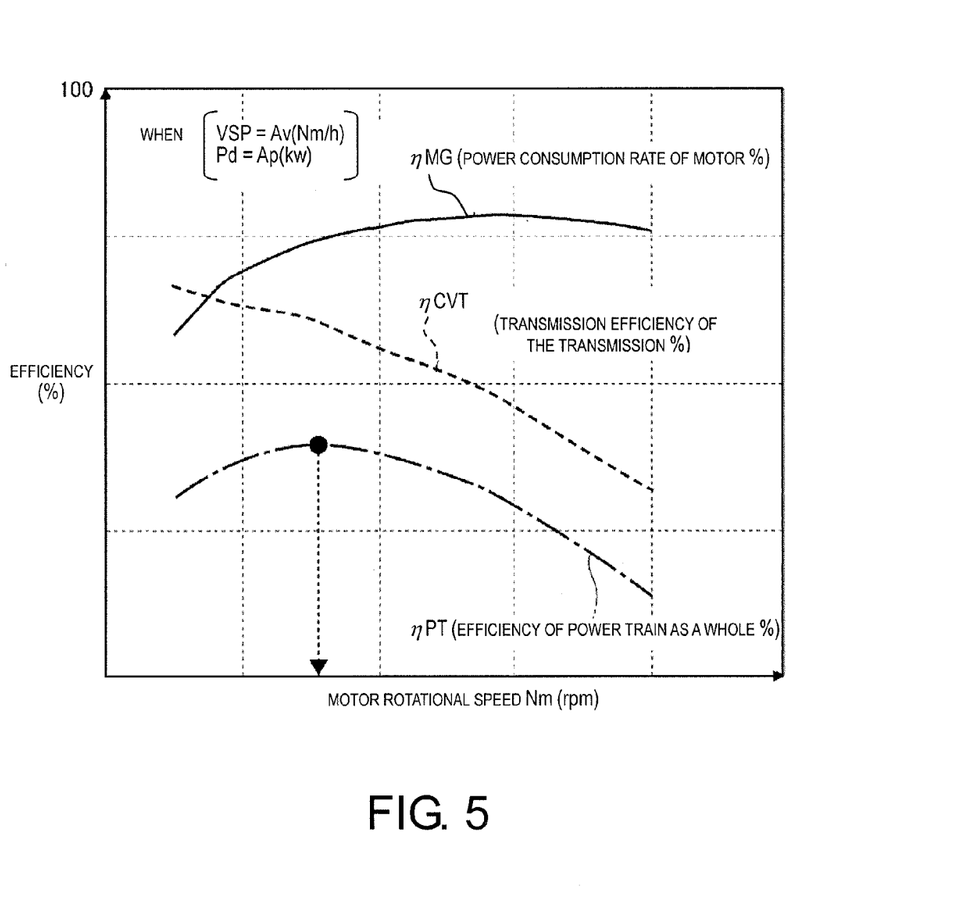
FIG. 5 is a characteristic diagram showing the changing characteristics of the motor power consumption efficiency ηMG (%), the transmission efficiency of the transmission ηCVT (%), and the efficiency of the power train as a whole ηPT (%) when combining a certain required driving power Ap (kw) and vehicle speed Av (km/h); this serves as a reference when determining the characteristic diagram shown in FIG. 4.

The method to determine the Map that is related to the relationship between the combination of the required driving power Pd and the vehicle speed VSP, as well as the target motor rotational speed tNm that can realize this combination with the best power consumption rate, as illustrated in FIG. 4, will be described in detail below. FIG. 5 shows the change characteristic with respect to both the power consumption rate $\eta MG$ of the motor (%) and the motor rotational speed Nm (rpm) with the transmission efficiency of the transmission $\eta CVT$ (%), using as an example of the combinations of the required driving power Pd and the vehicle speed VSP, as illustrated in FIG. 4, the combination of the required driving power Pd=Ap (kW) and the vehicle speed VSP=Av (km/h); in other words, using as an example a case in which a certain required driving power Pd=Ap (kW) is generated while driving at a certain vehicle speed VSP=Av (km/h).

FIG. 5 shows two-dimensional coordinates, where the vertical axis is graduated for both the power consumption rate $\eta MG$ of the motor (%) and the transmission efficiency of the transmission $\eta CVT$ (%), and the horizontal axis is graduated in the rotational speed of the motor Nm (rpm); this shows the change characteristics of the power consumption rate $\eta MG$ of the motor (%) and the transmission efficiency of the transmission $\eta CVT$ (%) with respect to the motor rotational speed Nm (rpm) on this two-dimensional coordinate drawing.

The power consumption rate $\eta MG$ of the motor (%) in FIG. 5 shows the electrical efficiency of the electric motor 3 and the inverter and plots them as a ratio between the actual power consumption (kW) that was required to generate the required driving power Pd=Ap (kW) and the required driving power Pd=Ap (kW) per the motor rotational speed Nm (rpm).

Meanwhile, the transmission efficiency of the transmission $\eta CVT$ (%) shows the transmission efficiency of the transmission when transmitting the required driving power Pd=Ap (kW) under a certain vehicle speed VSP=AV (km/h); this plots the ratio obtained by dividing the drive power Pd (kW) that was actually transmitted to the wheels by the drive power that was input into the transmission per the motor rotational speed Nm (rpm).

Here, the transmission efficiency of the transmission $\eta CVT$ (%) changes according to the input rotational speed of the transmission. When vehicle speed VSP=Av (km/h), the gear ratio is determined according to the input rotational speed in order to be the vehicle speed Av (km/h), when the input rotational speed changes, the gear ratio also changes; thus, the transmission efficiency of the transmission $\eta CVT$ (%) will also change.

For example, in a continuously variable transmission such as a V-belt-type continuously variable transmission or a toroidal-type continuously variable transmission, since the contact surface area of the shift member will change in order to change the gear ratio, the transmission efficiency of the transmission will change. Additionally, the transmission efficiency of the transmission will also change according to the amount of torque that is transmitted per one revolution. Besides the above, the efficiency will also change depending on a number of other parameters, such as the hydraulic pump for operating the transmission, and the transmission efficiency of the transmission ηCVT (%) in FIG. 5 represents a plot of these changes in efficiency that were determined experimentally in advance.

Meanwhile, in FIG. 5, the input rotational speed of the transmission is not recited, and only the rotational speed of the motor is recited; this is because, in the case of a power train of an electric vehicle equipped with a motor control device of the example of the present invention shown in FIG. 1, since the rotational speed of the motor and the input rotational speed will become equal, in FIG. 5, an assumption is made that the motor rotational speed =the input rotational speed of the transmission.

Furthermore, in FIG. 5, the above-described transmission efficiency of the transmission ηCVT (%) multiplied by the power consumption rate ηMG of the motor (%) is plotted as the efficiency of the power train as a whole ηPT (%). When considering the efficiency of the power train as a whole ηPT (%), selecting both the optimal power consumption rate ηMG of the motor (%) and the optimal transmission efficiency of the transmission ηCVT (%) is necessary; however, as shown in FIG. 5, the characteristics of the two do not match; for example, at a rotational speed with a good power consumption rate ηMG of the motor (%), the transmission efficiency of the transmission ηCVT (%) is not necessarily high, so the efficiency of the power train as a whole ηPT (%) will not become high. Meanwhile, in a region where the transmission efficiency of the transmission ηCVT (%) is high, the power consumption rate ηMG of the motor (%) is not necessarily high, so the efficiency of the power train as a whole ηPT (%) will not become high.

Thus, when the efficiency of the power train as a whole ηPT (%) becomes the highest, both the power consumption rate ηMG of the motor (%) and the transmission efficiency of the transmission ηCVT (%) are not maximized, but the efficiency of the power train as a whole ηPT (%) will be maximized. From this point of view, at a motor rotational speed that is selected as with the ·-symbol in FIG. 5, when generating a certain required driving power Pd=Ap (kW) under a certain vehicle speed VSP=Av (km/h), the efficiency of the power train as a whole ηPT (%) is maximized; when the vehicle is seen as a whole, the electric motor 3 will be driven with the best power consumption rate.

By calculating the target rotational speed of the electric motor 3 per each certain vehicle speed VSP and a certain required driving power Pd, which is determined from a map showing the power consumption rate ηMG of the electric motor 3 (%) and the transmission efficiency of the transmission ηCVT (%) per the motor rotational speed (rpm), such as in FIG. 5, a MAP such as the one shown in FIG. 4 can be obtained.

Meanwhile, in the present example, the motor rotational speed in which the efficiency of the power train as a whole ηPT (%) is maximized was selected as the motor rotational speed information; however, the information is not limited to this and can be information in which the motor rotational speed is set based on other conditions such as being greater than or equal to 80% efficiency, being greater than or equal to 90% efficiency, etc. Specifically, in the case that a maximum efficiency cannot be set due to mechanical limitations, such as the lowest/highest gear ratio in a continuously variable transmission, or due to the stepwise shifting in a stepped automatic transmission, the above-described idea of the present invention can be applied by setting an achievable efficiency in place of the maximum efficiency.

According to the drive force control and the rotational speed control of the electric motor 3 according to the present example described above, when calculating the target motor rotational speed tNm that contributes to these motor controls, since the motor rotational speed of the electric motor 3, with which the combination of the power consumption rate ηMG of the electric motor 3 (%) and the transmission efficiency of the automatic transmission 1 ηCVT (%) becomes the best power consumption rate, is set as the target motor rotational speed tNm based on the vehicle speed VSP and the required driving power Pd, this target motor rotational speed tNm can become the motor rotational speed information that can achieve the required driving power Pd with the best power consumption rate, while taking into consideration the loss related to the electric motor 3 and the loss in the automatic transmission 1.

Therefore, a guarantee can be made that the above-described target motor rotational speed tNm is the motor rotational speed information that can achieve the required driving power Pd with the best power consumption rate as the power train as a whole including the electric motor 3 and the automatic transmission 1. For this reason, as the power train as a whole (in an actual vehicle), the electric motor 3 can be controlled so as to reliably achieve the required driving power Pd with the best power consumption rate, and improvement of the power consumption rate can be reliably achieved. Moreover, this effect can be exerted in the same way, not only when the electric motor 3 is running but also when regenerative braking is being conducted.

Additionally, since the target motor rotational speed tNm is calculated from the required driving power Pd and the vehicle speed VSP, based on a map illustrated in FIG. 4 related to the relationship between the combination of the required driving power Pd and the vehicle speed VSP, as well as the target motor rotational speed tNm that can achieve this combination with the best power consumption rate, the effects mentioned above can be achieved at a low cost and with little computational load.

Furthermore, the required driving force Td is determined from the accelerator opening APO and the vehicle speed VSP, and the required driving power Pd is calculated from this required driving force Td and vehicle speed VSP, which contributes to the determination of the target motor rotational speed tNm, so that the computational load can be reduced in this respect as well.

In addition, since the target gear ratio i of the automatic transmission 1 is calculated from the target motor rotational speed tNm and the vehicle speed VSP, and an automatic transmission 3 is shift controlled so that the actual gear ratio matches this target gear ratio i and so that the target motor rotational speed tNm is realized, the target motor rotational speed tNm can be reliably achieved under the current vehicle speed VSP; as a result, the effects described above can be even more remarkable.

Furthermore, the target motor torque tTm of the electric motor 3 can be calculated from the target motor rotational speed tNm and the required driving power Pd, and the electric motor 3 is drive force controlled so that the actual motor torque matches this target motor torque tTm and so that the target motor torque tTm can be reliably achieved without affecting the motor rotational speed; as a result, the effects described above can be even more remarkable.

OTHER EXAMPLES

A case in which the electric vehicle is an electric vehicle that is equipped only with an electric motor 3 as the motor was described above; however, the above-described idea of the present invention can be applied in the same way in the case of a hybrid vehicle that is equipped with an electric motor and an engine as the motor, regardless of whether this hybrid vehicle is a series type or a parallel type and regardless of the arrangement order of the automatic transmission and the electric motor; the fact that the effects described above can be similarly exerted in any of these cases goes without saying.

Additionally, the above-described idea of the present invention can be similarly applied to a so-called one-motor two-clutch-type hybrid vehicle, which the present Applicant put to practical use and made commercially available under the product name "Fuga Hybrid;" in this case, the fact that the above-described effect can be similarly exerted also goes without saying.

Specifically, in the case of hybrid vehicles that are equipped with an electric motor and an engine as the motor, electric driving with just the electric motor is useful; therefore, by applying the above-described idea of the present invention during this electric driving, the efficiency of the power train as a whole that is made available to this driving can be improved, so that, during hybrid driving by both the electric motor and the engine, switching to normal controlling that considers the efficiency of the engine is better.

The invention claimed is:

1. An electric vehicle motor control device for an electric vehicle in which power from an electric motor is transmitted after an accelerator operation to driving wheels via an automatic transmission, the electric vehicle motor control device comprising:
    a vehicle speed detecting device that detects a vehicle speed of the electric vehicle;
    a controller including
        a required driving power calculating section that calculates a required driving power of the electric vehicle; and
        a target motor rotational speed calculating section that calculates a target motor rotational speed of the electric motor so that an efficiency of a product of a power consumption rate of the electric motor and a transmission efficiency of the automatic transmission will become a prescribed target efficiency, based on the vehicle speed and the required driving power, and
        a target gear ratio calculating section that calculates a target gear ratio of the automatic transmission from the target motor rotational speed and the vehicle speed,
        a shift control section that achieves the target motor rotational speed by shift control of the automatic transmission so that an actual gear ratio of the automatic transmission moves toward the target gear ratio that is calculated by the target gear ratio calculating section,
        a target motor torque calculating section that calculates a target motor torque of the electric motor to achieve the required driving power for the target motor rotational speed by dividing the required driving power by the target motor rotational speed, and
        a motor drive force controlling section that achieves the target motor torque by drive force controlling the electric motor so that an actual motor torque of the electric motor will move towards the target motor torque that is calculated by the target motor torque calculating section,
    the controller being programmed to control the electric motor based on the target motor rotational speed that is determined by the target motor rotational speed calculating section.

2. The electric vehicle motor control device as recited in claim 1, wherein
    the target motor rotational speed calculating section determines the target motor rotational speed based on a map.

3. The electric vehicle motor control device claim 1, wherein
    the required driving power calculating section calculates a required driving force from a required vehicle load and the vehicle speed, and
    the required driving power calculating section calculates the required driving power from the required driving force and the vehicle speed.

4. The electric vehicle motor control device as recited in claim 2, wherein
    the target motor rotational speed calculating section calculates the target motor rotational speed using the map that plots target motor rotational speed versus the required driving power for a plurality of vehicle speeds to achieve optimal efficiency.

5. The electric vehicle motor control device as recited in claim 4, wherein
    the target motor rotational speed calculating section calculates the target motor rotational speed such that the target motor rotational speed is determined based on the power consumption rate of the electric motor corresponding to a motor rotational speed at a specified vehicle speed and the transmission efficiency of the automatic transmission.

6. The electric vehicle motor control device as recited in claim 5, wherein
    the target motor rotational speed calculating section calculates the target motor rotational speed such that the product of the power consumption rate of the electric motor and the transmission efficiency of the automatic transmission is maximized for the specified vehicle speed.

7. The motor control device for electric vehicles as recited in claim 2, wherein
    the required driving power calculating section calculates a required driving force from a required vehicle load and the vehicle speed, and
    the required driving power calculating section calculates the required driving power from the required driving force and the vehicle speed.

* * * * *